US008867390B2

(12) United States Patent
Chen et al.

(10) Patent No.: US 8,867,390 B2
(45) Date of Patent: Oct. 21, 2014

(54) ADAPTIVE QUALITY OF SERVICE POLICY FOR DYNAMIC NETWORKS

(75) Inventors: Liren Chen, San Diego, CA (US); Jack Steenstra, San Diego, CA (US); Kirk S. Taylor, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 41 days.

(21) Appl. No.: 13/460,481

(22) Filed: Apr. 30, 2012

(65) Prior Publication Data

US 2012/0213114 A1    Aug. 23, 2012

Related U.S. Application Data

(62) Division of application No. 11/231,396, filed on Sep. 20, 2005, now Pat. No. 8,259,566.

(51) Int. Cl.
*G01R 31/08* (2006.01)
*H04L 1/00* (2006.01)

(52) U.S. Cl.
CPC ....... *H04L 1/0002* (2013.01); *H04L 2001/0098* (2013.01); *H04L 1/0007* (2013.01); *H04L 1/0017* (2013.01)
USPC ...................................................... 370/252

(58) Field of Classification Search
CPC ......... H04L 47/10; H04L 47/30; H04L 47/11; H04L 47/15; H04L 47/35; H04L 43/0852; H04W 24/00
USPC ................. 370/229, 230, 232, 235, 241, 252
See application file for complete search history.

(56) References Cited

U.S. PATENT DOCUMENTS

| | | | |
|---|---|---|---|
| 5,220,581 A * | 6/1993 | Ferraiolo et al. | 375/226 |
| 5,408,465 A | 4/1995 | Gusella et al. | |
| 5,673,254 A | 9/1997 | Crayford | |
| 5,732,078 A | 3/1998 | Arango | |
| 5,982,748 A | 11/1999 | Yin et al. | |
| 5,982,778 A | 11/1999 | Mangin et al. | |
| 6,046,981 A | 4/2000 | Ramamurthy et al. | |
| 6,049,528 A | 4/2000 | Hendel et al. | |
| 6,052,384 A | 4/2000 | Huang et al. | |
| 6,067,301 A | 5/2000 | Aatresh | |
| 6,104,700 A | 8/2000 | Haddock et al. | |
| 6,628,610 B1 * | 9/2003 | Waclawsky et al. | 370/229 |
| 6,707,821 B1 * | 3/2004 | Shaffer et al. | 370/395.4 |
| 6,760,309 B1 * | 7/2004 | Rochberger et al. | 370/235 |

(Continued)

FOREIGN PATENT DOCUMENTS

EP        1383353        1/2004

OTHER PUBLICATIONS

International Search Report and Written Opinion—PCT/US2006/036629—ISA/EPO—Feb. 13, 2007.

*Primary Examiner* — Anh Ngoc Nguyen
(74) *Attorney, Agent, or Firm* — S. Hossain Beladi

(57) ABSTRACT

A close-loop quality of service system is provided that collects real-time network performance indicators at the physical, data link and network layers. Using those indicators, the system dynamically controls the network traffic in order to achieve improved performance according to the priority and policy defined by a data user or system/network administrator. Several features of this quality of service system includes (1) dynamic maximum bandwidth reallocation, (2) dynamic maximum packet sizing, (3) adaptive policing, and/or (4) real-time link status feedbacks to make more efficient use of available bandwidth and adjust to transmission requirements.

16 Claims, 6 Drawing Sheets

(56) References Cited

U.S. PATENT DOCUMENTS

| | | |
|---|---|---|
| 6,909,726 B1 | 6/2005 | Sheeran |
| 6,944,169 B1 * | 9/2005 | Yoshizawa et al. ........... 370/410 |
| 6,956,867 B1 * | 10/2005 | Suga ............................ 370/465 |
| 7,161,957 B2 | 1/2007 | Wang et al. |
| 7,366,174 B2 | 4/2008 | MacFaden et al. |
| 7,499,401 B2 | 3/2009 | Buddhikot et al. |
| 7,535,841 B1 | 5/2009 | Beshai et al. |
| 2001/0015956 A1 | 8/2001 | Ono |
| 2001/0038630 A1 | 11/2001 | Tong et al. |
| 2002/0010938 A1 | 1/2002 | Zhang et al. |
| 2002/0186660 A1 | 12/2002 | Bahadiroglu |
| 2006/0268699 A1 | 11/2006 | Balandin et al. |
| 2007/0002740 A1 | 1/2007 | Evans et al. |

\* cited by examiner

ADAPTIVE QUALITY OF SERVICE POLICY FOR DYNAMIC NETWORKS

This application is a divisional of U.S. patent application Ser. No. 11/231,396, entitled "Adaptive Quality of Service Policy for Dynamic Networks," inventors Liren Chen et al., filed Sep. 20, 2005, the entirety of which is incorporated herein by reference.

BACKGROUND

1. Field

Various features pertain to communication and/or data networks. At least one implementation pertains to a method, system, and device for providing quality of service information to adaptively allocate network resources and modify traffic and priority policy.

2. Background

Communication networks serve to transfer various types of information including data, voice, audio, video, or other forms of content and control signals. The Open System Interconnection (OSI) model provides structured layers to implement communications across a network. The OSI layers define standards at each level of the network: physical (layer 1), data link (layer 2), network (layer 3), transport (layer 4), session (layer 5), presentation (layer 6), and application (layer 7).

Because networks have a limited bandwidth through which to transfer this information, they typically prioritize the order in which information is transmitted. This prioritizing of information on a network is commonly used to guarantee a quality of service (QoS) or the particular type of transmission (e.g., data, voice, video, etc.). For example, time-sensitive information, such as voice packets for a telephonic call, may be given priority over less time-sensitive information, such as text messages.

The current technique to configure QoS support during setup of a given network is to specify the committed bandwidth and priority for each type of service. This works well on a network that has static bandwidth with stable link speed, and known or predictable latency and packet loss characteristics. Conventional QoS techniques typically assume a dedicated link speed, such as a T1 connection providing 1.5 Mbps or ADSL connection operating at about 100 Kbps. Bandwidth usage configuration usually happens during the setup of QoS policy and is not easily adjustable after that point. A static link speed is assumed and used for rate-limiting configuration of one more service classes. No real-time feedback is available to make QoS policy adjustments when the bandwidth changes dynamically. This creates problems in implementing QoS when the link speed changes, as would be the case where the link degrades for instance. Thus, conventional QoS policy configurations are conservative in their bandwidth allocations and wasteful of network resources, or overly ambitious in their bandwidth allocations and perform poorly in adverse link conditions, For a network that has dynamic bandwidth characteristics, such as a wireless network (e.g., an evolutionary data optimized (EVDO) network), the current QoS policy techniques would either be ineffective to police the traffic or require an administrator to be way too conservative, and therefore wasteful, with the precious network resources. That is, in networks where the bandwidth may vary or the amount and types of information transferred are unpredictable, it becomes difficult to allocate bandwidth among the services (e.g., data, voice, video, control signals, etc.) supported.

SUMMARY

A close-loop QoS system is provided at the network layer to collect real-time network performance indicators at the physical, data link and network layers. Using those indicators, the system dynamically controls the network traffic in order to achieve improved performance according to the priority and policy defined by a data user or system/network administrator. Several features of this QoS system includes (1) dynamic maximum bandwidth reallocation, (2) dynamic maximum packet sizing, (3) adaptive policing, and/or (4) real-time link status feedbacks to make more efficient use of available bandwidth and adjust to transmission requirements.

A method for adaptive bandwidth reallocation for quality of service policy of a dynamic communication link is also provided comprising (a) receiving digital information from one or more sources, (b) organizing the digital information into packets, each packet associated with one of a plurality of service classes, (c) dynamically adjusting a quality of service policy to reallocate the maximum bandwidth per service class if the bandwidth of the dynamic communication link changes, and (d) transmitting the packets according to a predefined quality of service policy. The method further comprises monitoring the real-time bandwidth characteristics of the dynamic communication link. The delivery priority level associated with each packet is determined by the timing requirements of the digital information contained in the packet. The method further comprises (a) dynamically adjusting a maximum packet size for the packets to maintain a maximum packet transmission time across the dynamic communication link approximately constant, and (b) rearranging the order of packets to give time-sensitive packets greater priority if jitter is present.

Another embodiment provides a machine-readable medium having one or more instructions for implementing adaptive policing of digital information packets, which when executed by a processor causes the processor to (a) determine whether jitter is present in a dynamic communication link, and (b) rearrange the order of digital information packets to give time-sensitive packets greater priority when jitter is present. The machine-readable medium further comprises one or more instructions to determine delivery priorities of a plurality of digital information packets.

Another embodiment provides a machine-readable medium having one or more instructions for sharing dynamic link status information across two or more network stack layers, which when executed by a processor causes the processor to (a) implement two or more network stack layers to transmit digital information of one or more service classes across the dynamic communication link; and (b) share dynamic link status information from a first network stack layer with a second network stack layer. The first network stack layer is either the physical layer or data link layer of a network stack and the second network stack layer is the network layer. The machine-readable further comprising one or more instructions to obtain real-time link status feedback from a data link layer of the network stack and apply it to quality of service operations at the network layer of the network stack.

Several of the described features may also be implemented as part of one or more apparatus or devices.

DETAILED DESCRIPTION

Figure 1:
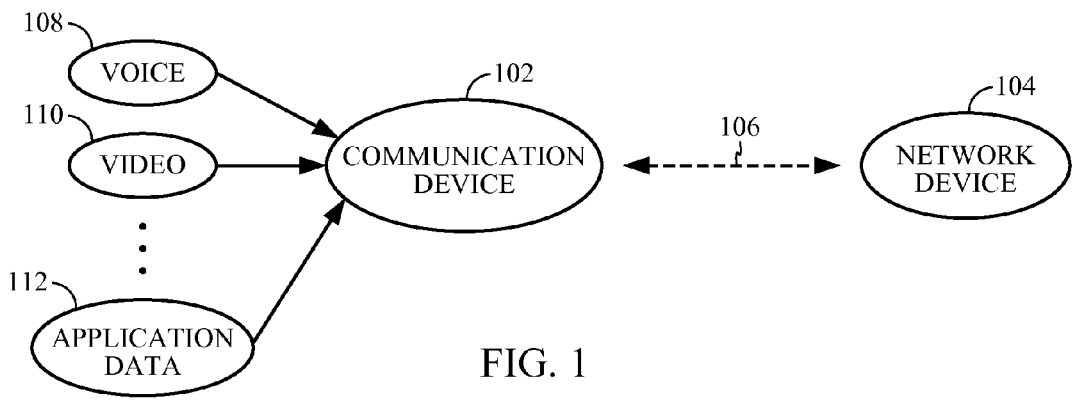
FIG. 1 illustrates a communication system in which dynamic bandwidth and/or traffic reallocation policy adjustments may be implemented.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment my represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc, may be passed, forwarded, or transmitted via any suitable means including memory sharing, message passing, token passing, network transmission, etc.

One feature provides quality of service (QoS) support according to predefined policies on networks that have dynamic bandwidth, network latency and/or packet loss rates. One implementation of the QoS scheme is applied on top of the physical network to adapt to the real-time characteristics of the network and adjust the priority of different services dynamically based on pre-set policies.

A close-loop QoS system is provided at the network layer to collect real-time network performance indicators at the physical, data link and network layers. Using those indicators, the system dynamically controls the network traffic in order to achieve improved performance according to the priority and policy defined by a data user or system/network administrator. Several features of this QoS system includes (1) dynamic maximum bandwidth reallocation, (2) dynamic maximum packet sizing, (3) adaptive policing, and/or (4) real-time link status feedbacks to make more efficient use of available bandwidth and adjust to transmission requirements.

FIG. 1 illustrates a communication system in which dynamic bandwidth and/or traffic reallocation and policy adjustments may be implemented. One situation in which a dynamic bandwidth may be encountered is where some portion of the communications is performed over a wireless link. For example, a network communication device 102 wirelessly communicates with other network devices 104 via a wireless communication link/interface 106. Communication device 102 may be a server configured to operate as a gateway, router, bridge, and/or repeater, that communicatively links one or more user devices 108, 110, 112 (e.g., phones, computers, personal communication devices, personal digital assistants, web browsers, etc.) to the rest of the network (e.g., network device 104). The links between communication device 102 and the user devices 108, 110, 112 may be either wireless or wired. Generally, communication device 102 receives information from user devices 108, 110, 112 and forwards it over wireless link 106 to network device 104. Similarly, communication device 102 receives information over wireless link 106 and distributes it to the appropriate recipient user device 108, 110, 112.

Network device 104 may be a server configured to operate as a gateway, router, bridge, and/or repeater. Both communication device 102 and network device 104 may act as gateways for different subnets. In one implementation, traffic control QoS policy and advanced routing is applied at communication device 102 and network device 104 to control traffic in both directions. Generic routing encapsulation (GRE) may be applied at each end (communication device 102 and network device 104) and a tunnel built between communication device 102 and network device 104.

In one implementation, communication device 102 is located on an aircraft and communicates with various types of user devices 108, 110, 112 on the aircraft Communication device 102 may act as a gateway to communicate with other wired or wireless networks (e.g., via gateway 104). In this manner, user devices 108, 110, 112 are able to communicate beyond the aircraft even when the aircraft is in flight. Network device 104 may be a ground-based or air-borne gateway which enables communications with other ground-base or air-borne user devices or gateways.

Figure 2:
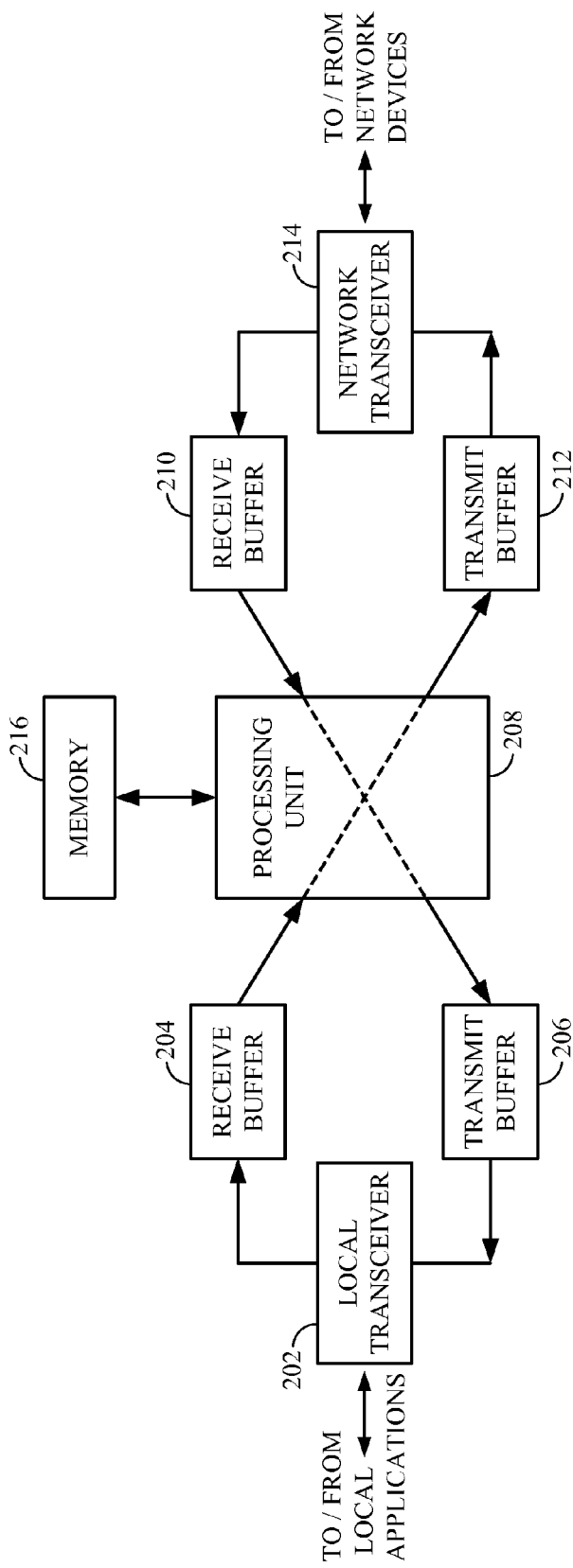
FIG. 2 illustrates is a block diagram of one implementation of a communication device 200 that may be employed to perform bandwidth and/or traffic reallocation and policy adjustments.

FIG. 2 illustrates is a block diagram of one implementation of a communication device 200 that may be employed to perform bandwidth and/or traffic reallocation and policy adjustments. Communication device 200 may be used as communication device 102 in FIG. 1, and function as a modem, gateway, or network interface to provide a network link for one or more local applications and/or devices. Communication device 200 includes a local transceiver 202 and a corresponding first set of receive and transmit buffers 204 and 206 communicatively coupled to a processing unit 208. The processing unit 208 is also communicatively coupled to a second set of receive and transmit buffers 210 and 212 which are coupled to a network transceiver 214. The processing unit 208 manages traffic between the local transceiver 202 and network transceiver 214 and may be configured to implement several features, including (1) dynamic maximum bandwidth reallocation, (2) dynamic maximum packet sizing, (3) adaptive policing, and/or (4) real-time link status feedbacks to make more efficient use of available bandwidth (through the communication link of the network transceiver 214) on and adjust to transmission requirements. A memory device 216 may be coupled to the processing unit 208 to facilitate these traffic management functions. Note that one or more of the components and functions illustrated in FIG. 2 may be combined into a single component or embodied in several components without departing from the invention.

Figure 3:
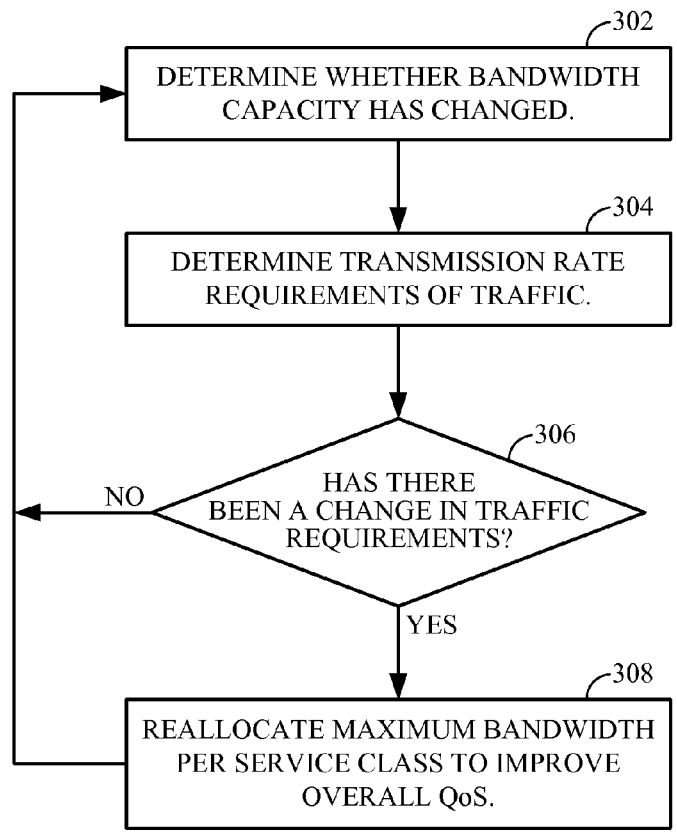
FIG. 3 illustrates a method for adjusting the maximum bandwidth usage per service class on a gateway when dynamic bandwidth changes occur.

FIG. 3 illustrates a method for adjusting the maximum bandwidth usage per service class on a gateway, such as communication device 102, when dynamic bandwidth changes occur. As the distribution or types of applications communicating through communication device 102 changes, it becomes wasteful to fix the bandwidth allocation to some set rate. Thus, communication device 102 is configured to recognize changes in the bandwidth and dynamically reallocate the bandwidth to more efficiently make use of communication link 106.

Communication device 102 may be configured to dynamically allocate the bandwidth among various service classes or applications communicating over the network. A determination is made on whether the bandwidth capacity has changed 302. This may occur, for example, as a result of environmental conditions that affect the quality of transmissions/reception or other factors that degrade or improve communication link 106 and affect the bandwidth. In one implementation, this determination may be made by tracking signal-to-noise ratio's and/or error rates on communication link 106. For instance, an increase in the packet retries or receive/transmit errors indicates a decrease in bandwidth capacity.

The communication device then determines the transmission rate requirements of traffic in reallocating the bandwidth 304. For instance, the maximum bandwidth allocations for each service class or application may simply be proportional to the original/previous maximum bandwidth allocation for each service class or application. Thus, when the bandwidth increases or decreases, the maximum percentage allocated to each service class or application remains the same. Alternatively, communication device 102 may also determine whether there have been changes in traffic requirements 306. For instance, the type and/or number of applications communicating through communication device 102 over wireless communication link 106 may change over time. For example, communication device 102 may initially allocate fifty percent of the bandwidth of link 106 for voice (e.g., VOIP) communications and fifty percent for web browsing applications. However, usage information may indicate that voice communications account for greater bandwidth usage than web browsing applications over link 106. Thus, better bandwidth usage may be achieved by reallocating the maximum bandwidth per service class 308 to improve overall QoS. For example, a greater bandwidth percentage (e.g., seventy percent) is allocated to voice communications versus web browsing applications (e.g., thirty percent).

Yet another implementation provides a discretionary denial-of-service to maintain QoS for a dynamic bandwidth. For example, if the maximum allocated bandwidth for a particular service class or application can only support two applications at their minimum communication rates, then communication device 102 may drop or deny service to any other application of the same service class that attempts to communicate over the allocated bandwidth. That is, rather than provide poor or ineffective service to all applications, communication device 102 limits the number of applications or communication sessions supported at any one time. This way, communication device 102 can at least guaranty a minimum transmission rate to some applications or services.

Yet another implementation provides for making the maximum bandwidth for a service class at least as large as the minimum bandwidth required for a single application or communication session. That is, rather than making a maximum bandwidth for a service class so small that it cannot adequately support even a single application, the maximum bandwidth is allocated such that it is at least as large as the minimum bandwidth required for that service class or application.

Yet another feature provides for making a maximum bandwidth allocation an integer multiple of the minimum required bandwidth for that particular service class or application. For example, allocating a maximum bandwidth that is 3.5 times the minimum required bandwidth for a service class may waste bandwidth when the communication channel is operating at full-capacity (e.g., three applications/sessions communicating at the minimum rate.). To make better use of the overall bandwidth, it may be beneficial to make the maximum bandwidth allocation for a service class an integer multiple of the minimum required bandwidth for that particular service class.

In some situations, the dynamic bandwidth may become so small that it becomes impossible to provide a minimum bandwidth required to support certain classes of services. For instance, the overall dynamic bandwidth may decrease so much that the maximum bandwidth allocated for a particular service class is less than the required minimum bandwidth for that service. In such situations, rather than allocating a useless amount of bandwidth to a particular service class, that bandwidth is reallocated to other service classes that can benefit or make use of that bandwidth. As the dynamic bandwidth increases, the denied service class may again receive a bandwidth allocation.

Figure 4:
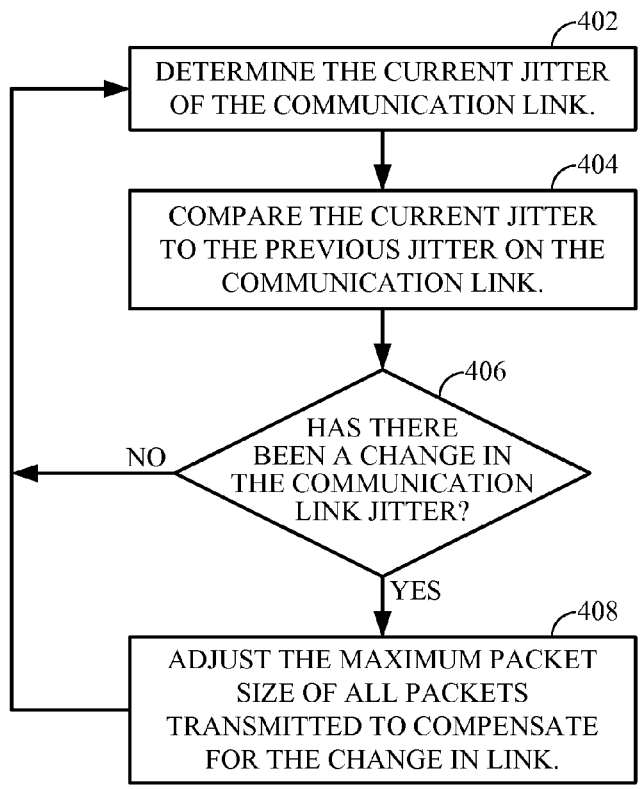
FIG. 4 illustrates a method for dynamic packet maximum sizing that may be implemented on a gateway to adjust QoS policy.

FIG. 4 illustrates a method for dynamic maximum packet sizing that may be implemented on a gateway, such as communication device 102, to adjust QoS policy and address jitter in a communication link. Abrupt variations in the available bandwidth result in unwanted timing jitter (e.g., variations or instability in the duration of a specified time interval) of the transmission link, where transmission times increase and/or decrease. This increase/decrease in link transmission time has a negative impact on the delivery of time-sensitive information, such as voice over IP packets. In particular, it makes it difficult for the communication system to determine a maximum transmission delay so that it can guarantee delivery of high priority packets.

One solution to such link jitter is to adjust the maximum packet size of all information being transmitted so that the actual time of transmission (or transmission delay) stays below a particular threshold. A determination is made as to the current jitter of the communication link 402. This may be done by measuring timing variations between received packets. Then, the current jitter is compared to the previous jitter 404 to determine if there has been a change in the communication link jitter 406. If there has been a change in the communication link jitter, the maximum packet size of all packets transmitted is adjusted to compensate for the change in jitter 408. For example, if the timing jitter has increased above a particular threshold (meaning that the maximum packet transmission delay or time has increased above a particular threshold), the maximum packet size of all packets across the communication link is reduced to maintain the maximum transmission time or delay approximately constant. In this manner, the system can have a guaranteed maximum transmission delay or time.

Figure 5:
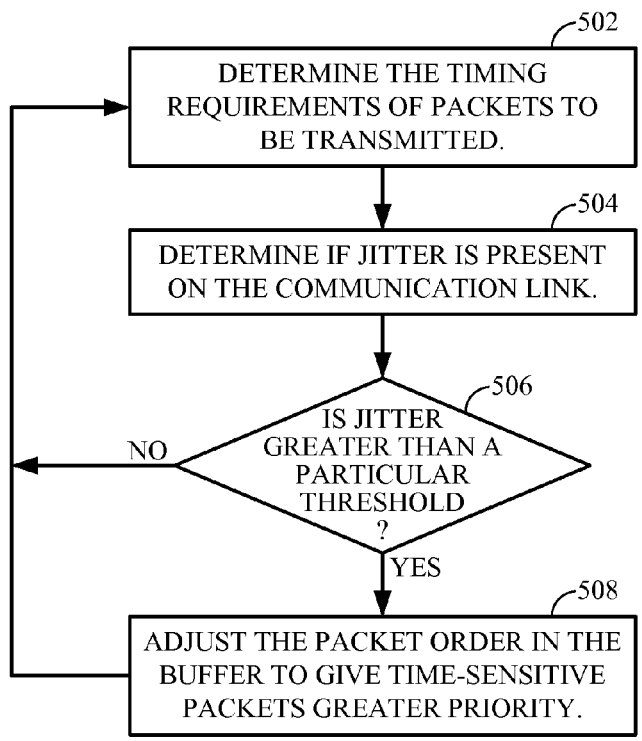
FIG. 5 illustrates a method for adaptive policing that may be implemented on a gateway to adjust QoS policy.

FIG. 5 illustrates a method for adaptive policing that may be implemented on a gateway, such as communication device 102, to adjust QoS policy. This feature monitors jitter in the link 106 and arranges the transmission order of packets according to their time-to-user or priority characteristics. When transmitting voice-over-IP (VOIP), for instance, jitter may be experienced over the link that may degrade the quality of the conversation. For example, given a 1,500 Byte IP packet and a 120 kbps return link rate, it takes over 100 milliseconds to send one packet. The VOIP packets would typically be interleaved between pluralities of other packets for other sessions. Jitter may cause some VOIP packets to experience noticeable delays and degrade a conversation. Thus, adaptive policing is implemented to counter this problem. A mechanism is provided to dynamically reset or adjust the quality of service (QoS) policy in order to control the network traffic based on preset guideline(s).

In one example, traffic is shaped by classifying it into a plurality of classes in ascending or descending priority. For instance, traffic may be classified, from highest priority to lowest priority, as follows: 1) voice control traffic, including Session Initiation Protocol (SIP) and network control packets; 2) voice-bearing traffic, including Real-time Transport Protocol (RTP) and voice carrying packets; 3) acknowledges, such as Internet Control Message Protocol (ICMP) and Transport Communication Protocol (TCP) ACK's; 4) web browsing—hypertext transfer protocol (HTTP)—and other interactive applications; and 5) all the remaining traffic.

The timing requirements (e.g., time-to-user requirements) or traffic priorities are determined for the various packets and/or session 502. For example, text data packets may require guaranteed delivery but can withstand longer delays. Meanwhile, voice communications (e.g., VOIP packets) can withstand dropped packets but have shorter delays. Generally, prior knowledge of applications is necessary in order to properly shape the traffic priority.

The system may monitor a buffer to determine the characteristics of the packets therein. The presence of jitter in the communication link (e.g., link 106 in FIG. 1) is also determined 504. This may be done by measuring tuning variations between received packets. If jitter greater than a particular threshold is detected 506, then the order of packets in the buffer is adjusted to give time-sensitive packets greater priority 508. That is, time-sensitive packets are moved ahead of some less time-dependent packets. The system then continues to monitor the timing requirements of packets and presence of jitter.

In one implementation, various fair queuing schemes (e.g., stochastic fair queuing) are applied to all queues such that the system randomly or pseudo-randomly extracts packets of different priority levels for transmission. This prevents high-priority packets from monopolizing the limited bandwidth to the detriment of other service classes or applications.

Yet another feature of adaptive policing limits low priority traffic to a transmission rate less than the link speed and limits their burst rates. In this manner, the QoS for higher priority traffic can be maintained.

Figure 6:
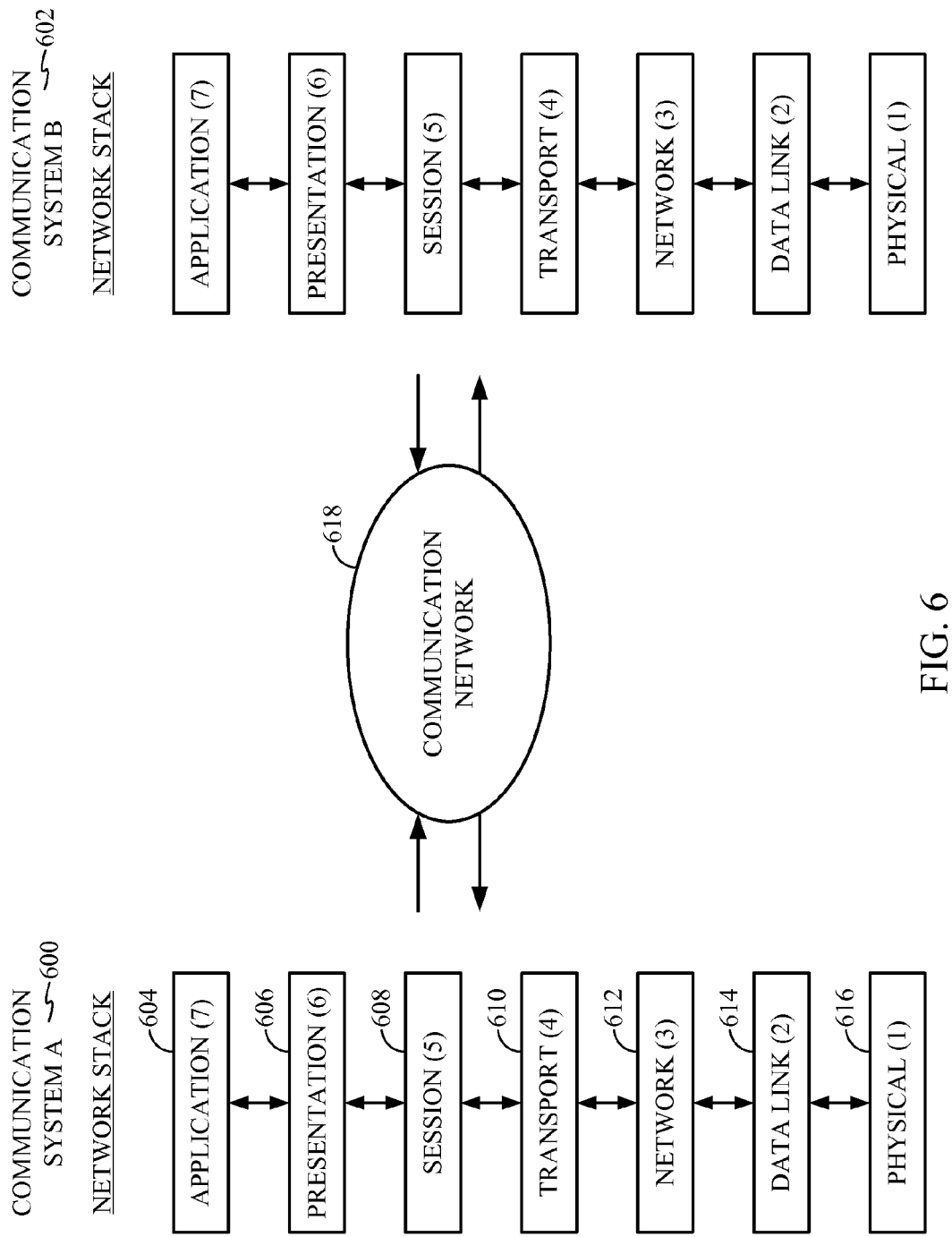
FIG. 6 illustrates one example of a communication system configured to provide adaptive quality of service at a first and/or second communication devices by implementing link status information across a network stack.

FIG. 6 illustrates a communication system where real-time link status information can be shared across layers of a network stack. The network stack may be similar to an OSI model having an Application Layer (Layer 7) 604, a Presentation Layer (Layer 6) 606, a Session Layer (Layer 5) 608, a Transport Layer (Layer 4) 610, a Network Layer (Layer 3) 612, a Data Link Layer (Layer 2) 614, and a Physical Layer (Layer 1) 616. Application layer 604 provides network services to end-users or applications. Presentation layer 606 converts the local data to a standard byte representation. Session layer 608 defines the format of the data sent over the connections. Transport layer 610 subdivides the content in a user buffer into network-buffer sized datagrams and enforces a desired transport protocol. Network layer 612 is responsible for routing or directing datagrams from one network to another. Data layer 614 defines the format of data on the network (e.g., data frame, packet, checksums, source and destination address, data, etc.) Physical layer 616 defines the physical media employed for communications.

One implementation provides a mechanism to collect real-time link status feedback of the physical (Layer 1) and data link (Layer 2) layers at the network layer (Layer 3). These network performance indicators are used at the network layer (Layer 3) in order to decide the optimal policy to police traffic through a gateway. That is, having real-time information about the link status may improve the performance of many of the QoS features described above. In the standard OSI model, this information is found in Layer 2 (Data. Link layer.) However, QoS is typically implemented at higher layers, such as Layer 3 (Network layer). Thus, one feature of the invention provides for access to link status information, such as packet sizes, data rates, dropped packet statistics, etc., to be accessible at the Layer 3 or above. This may be done through software hooks that allow Layer 3 applications to retrieve link status information from Layer 2.

An alternative technique provides a live monitoring mechanism that collects network layer (Layer 3) performance information for different service classes and provides closed-loop real-time feedback to control the QoS policy. This technique isolates the network layer (Layer 3) policy from the underlining physical network (Layer 2) and makes this technique adaptive to an EVDO network and other types of networks.

FIG. 6 illustrates one example of a communication system configured to provide adaptive quality of service at a first and/or second communication systems 600 and 602 by implementing link status information sharing across a network stack. First and second communication systems 600 and 602 are communicatively coupled to each other via a network 618 (e.g., wired and/or wireless network) to transmit information. Each communication device or associated devices may implement a network stack that facilitates one or more of the QoS policy adjustment features described above. Thus, link status information from the Physical layer (1) and Data Link layer (2) may be accessible to Network layer (3) and used to improve communications at one or both sides of the communication link between communication devices A and B.

Communication systems 600 and 602 may include one or more systems that implement the network stack. For example, layers 1, 2, and 3 may be implemented on a modem, router, or gateway while layers 4, 5, 6, and 7 may be implemented on a personal communication device such as a mobile phone, computer, personal digital assistant, etc.

In one implementation, communication system 600 may be a gateway on an aircraft that serves one or more personal communication devices (e.g., cell phones or computers) in the aircraft and provides a communication link to devices other communication devices inside or outside the aircraft (e.g., to other devices on land, inside the same aircraft, or on other aircraft). Using status link sharing across network stack layers, communication system 600 may be configured to perform (1) dynamic maximum bandwidth reallocation, (2) dynamic maximum packet sizing, (3) adaptive policing, and/or (4) real-time link status feedbacks to make more efficient use of a bandwidth and adjust to transmission requirements as described above. Through the network stack one or more of these techniques may be implemented. These techniques may be applied at various layers of the network stack illustrated in FIG. 6 without departing from the invention.

Figure 7:
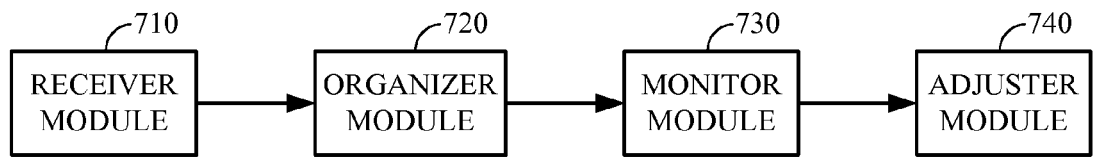

FIGS. 7-11 illustrate examples of various other implementations to achieve various operations in accordance to the description above. In FIG. 7, a communication gateway may comprise a receiver module 710, an organizer module 720, a monitor module 730 and an adjuster module 740. Receiver module 710 is configured to receive digital information. Organizer module 720 is configured to organize the digital information into packets, where each packet associated with one of a plurality of service classes. Monitor module 730 is configured to monitor real-time characteristics of a dynamic communication link to identify a change in bandwidth. Adjuster module 740 is configured to adjust a quality of service policy to reallocate the maximum bandwidth per service class, if the bandwidth of the dynamic communication link changes.

Figure 8:
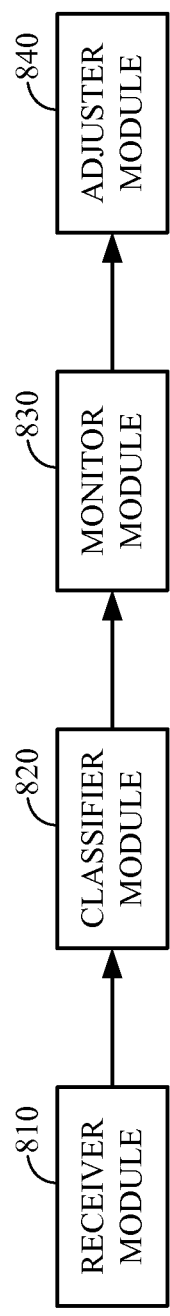
FIG. 7-11 illustrate other example apparatus that may be employed.

FIG. 8 illustrates an apparatus comprising a receiver module 810, a classifier module 820, a monitor module 830, an adjuster module 840. Receiver module 810 is configured to receive digital information. Classifier module 820 is configured to classify the digital information into one or more service classes. Monitor module 830, is configured to monitor real-time characteristics of a dynamic communication link having varying bandwidth. Adjuster module 840 is configured to dynamically adjust a quality of service policy for the one or more service classes according to the real-time characteristics of the dynamic communication link.

Figure 9:
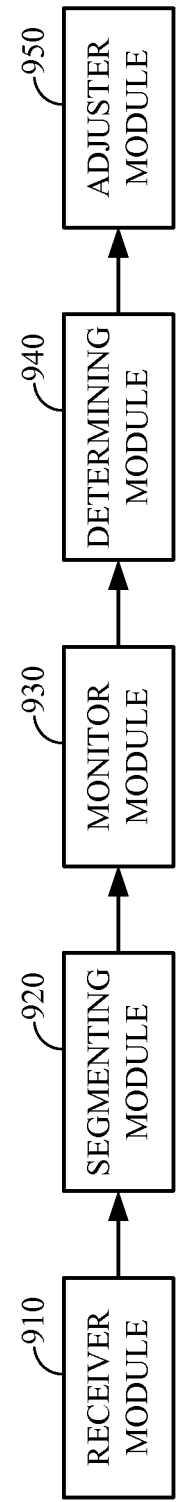

FIG. 9 illustrates an apparatus comprising a receiver module 910, a segmenting module 920, a monitor module, a determining module 940 and an adjustor module 950. Receiver module 910 is configured to receive digital information. Segmenting module 920 is configured to segment the digital information into packets. Monitor module 930 is configured to monitor real-time characteristics of a dynamic communication link having varying bandwidth. Determining module 940 is configured to determine if timing jitter of the dynamic communication link has changed. Adjuster module 950 is configured to dynamically adjust a maximum packet length of the digital information to maintain a maximum packet transmission time approximately constant.

Figure 10:
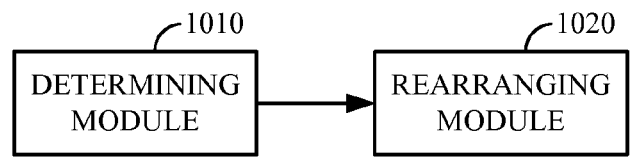
Figure 11:
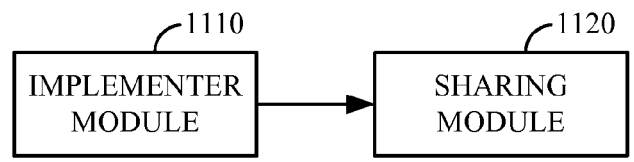

FIG. 10 illustrates another apparatus comprising a determining module 1010 configured to determine whether jitter is present in a dynamic communication link and a rearranging module 1020 configured to adaptively rearrange the order of digital information packets to give time-sensitive packets greater priority when jitter is present. FIG. 11 illustrates still another apparatus comprising an implementer module 1110 configured to implement two or more network stack layers to transmit digital information from one or more service classes across a dynamic communication link and a sharing module 1120 configured to share dynamic link status information from a first network stack layer with a second network stack layer.

It should be noted that the gateway and apparatus of FIGS. 7-11 are examples and may comprise other elements. Also, one or more of the elements of FIGS. 7-11 may be implemented together. Moreover, one or more of the elements of FIGS. 7-11 may be implemented by various means as necessary.

Accordingly, it should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art. For instance, one or more of the components and/or functions described herein may be combined into a single component or embodied in multiple components without departing from the invention.

What is claimed is:

1. A method for adaptive bandwidth reallocation for quality of service policy of a dynamic communication link comprising:
   receiving digital information from one or more sources;
   organizing the digital information into packets, each packet associated with one of a plurality of service classes;
   dynamically adjusting a quality of service policy to control network traffic when network performance indicators change; and
   transmitting the packets according to a predefined quality of service policy;
   wherein the dynamically adjusting the quality of service policy comprises reallocating maximum bandwidth per service class to improve overall quality of service.

2. The method of claim 1 further comprising:
   monitoring jitter characteristics of the dynamic communication link.

3. The method of claim 1 wherein a delivery priority level associated with each packet is determined by the timing requirements of the digital information contained in the packet.

4. The method of claim 1 further comprising:
   dynamically adjusting a maximum packet size for the packets to maintain a maximum packet transmission time across the dynamic communication link approximately constant; and
   rearranging the order of packets to give time-sensitive packets greater priority if jitter is present.

5. An apparatus for adaptively reallocating bandwidth for quality of service policy of a dynamic communication link comprising:
   means for receiving digital information from one or more sources;
   means for organizing the digital information into packets, each packet associated with one of a plurality of service classes;
   means for dynamically adjusting a quality of service policy to control network traffic when network performance indicators; and
   means for transmitting the packets according to a predefined quality of service policy;
   wherein the means for dynamically adjusting the quality of service policy comprises means for reallocating maximum bandwidth per service class to improve overall quality of service.

6. The apparatus of claim 5 further comprising:
   means for monitoring jitter characteristics of the dynamic communication link.

7. The apparatus of claim 5 wherein a delivery priority level associated with each packet is determined by the timing requirements of the digital information contained in the packet.

8. The apparatus of claim 5 further comprising:
 means for dynamically adjusting a maximum packet size for the packets to maintain a maximum packet transmission time across the dynamic communication link approximately constant; and
 means for rearranging the order of packets to give time-sensitive packets greater priority if jitter is present.

9. An apparatus for adaptively reallocating bandwidth for quality of service policy of a dynamic communication link comprising:
 a receiver configured to receive digital information from one or more sources;
 a processor configured to:
  organize the digital information into packets, each packet associated with one of a plurality of service classes; and
  dynamically adjust a quality of service policy to control network traffic when network performance indicators change; and
 a transmitter configured to transmit the packets according to a predefined quality of service policy;
 wherein dynamically adjusting the quality of service policy comprises reallocating maximum bandwidth per service class to improve overall quality of service.

10. The apparatus of claim 9 wherein the processor is further configured to monitor jitter characteristics of the dynamic communication link.

11. The apparatus of claim 9 wherein a delivery priority level associated with each packet is determined by the timing requirements of the digital information contained in the packet.

12. The apparatus of claim 9 wherein the processor is further configured to:
 dynamically adjust a maximum packet size for the packets to maintain a maximum packet transmission time across the dynamic communication link approximately constant; and
 rearrange the order of packets to give time-sensitive packets greater priority if jitter is present.

13. A non-transitory computer readable medium having a set of instructions stored thereon, the set of instructions being executable by one or more processors and the set of instructions comprising:
 instructions for organizing digital information received from a plurality of sources into packets, each packet associated with one of a plurality of service classes;
 instructions for dynamically adjusting a quality of service policy to control network traffic when network performance indicators change; and
 instructions for providing the packets for transmission according to a predefined quality of service policy;
 wherein instructions for dynamically adjusting the quality of service policy comprise instructions for reallocating maximum bandwidth per service class to improve overall quality of service.

14. The non-transitory computer readable medium of claim 13 further comprising:
 instructions for monitoring jitter characteristics of the dynamic communication link.

15. The non-transitory computer readable medium of claim 13 wherein a delivery priority level associated with each packet is determined based on the timing requirements of the digital information contained in the packet.

16. The non-transitory computer readable medium of claim 13 further comprising:
 instructions for dynamically adjusting a maximum packet size for the packets to maintain a maximum packet transmission time across the dynamic communication link approximately constant; and
 instructions for rearranging the order of packets to give time-sensitive packets greater priority if jitter is present.

* * * * *